Aug. 8, 1933.    B. STALLARD    1,921,432
CONSTANT TEMPERATURE APPARATUS
Filed May 5, 1930
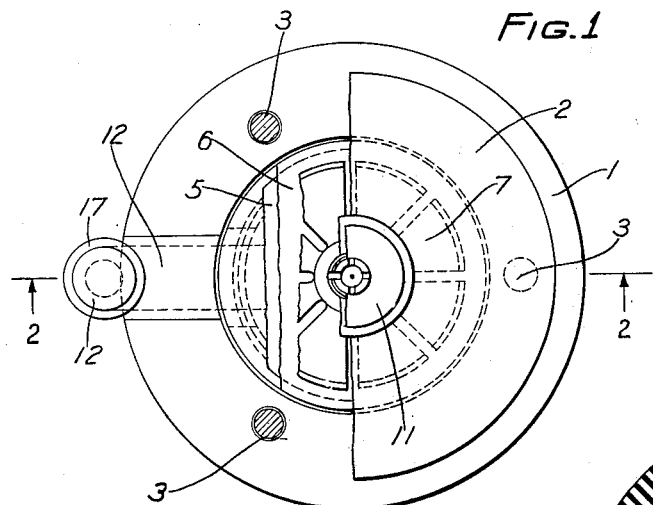
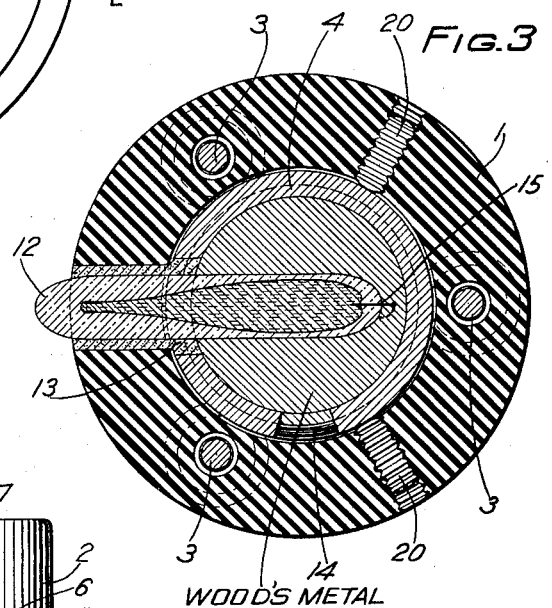
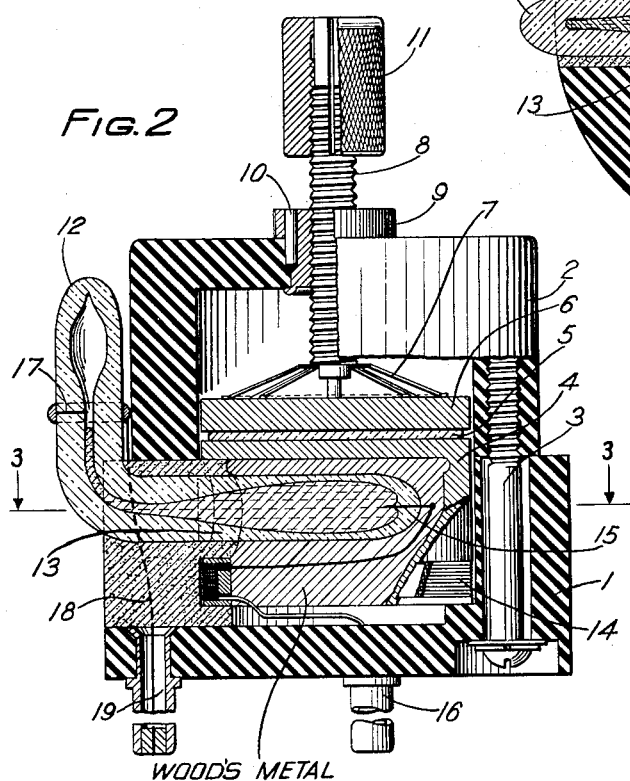
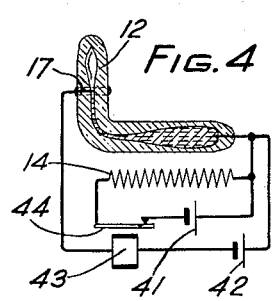
INVENTOR
B. STALLARD
BY
ATTORNEY Patented Aug. 8, 1933

1,921,432

UNITED STATES PATENT OFFICE 1,921,432

CONSTANT TEMPERATURE APPARATUS

Burrell Stallard, New York, N. Y., assignor to Bell Telephone Laboratories, Incorporated, New York, N. Y., a Corporation of New York Application May 5, 1930. Serial No. 449,703

7 Claims. (Cl. 171—327)

This invention relates to constant temperature apparatus and particularly to such apparatus as adapted for use with radio transmitters on aircraft.

An object of this invention is to provide means to control the temperature, and hence the frequency of vibration, of a piezo-electric device or the like, within narrow limits.

Another object of this invention is to provide a holder for a piezo-electric crystal, or other object whose temperature it is desired to maintain constant, which shall be small in size, light in weight, rugged in construction, efficient in operation and at the same time strictly portable, and which may be subjected to sudden changes of temperature, atmospheric pressure or humidity, or to rough handling, without adversely affecting its efficiency of operation.

A feature of this invention is the provision of a temperature responsive element which is embedded in Wood's metal or other low melting conductive material.

In the design and construction of a radio transmitter for use on aircraft, particularly airplanes, all of the conditions mentioned above are important factors to be considered, and this invention therefore relates particularly to radio transmitters for use on aircraft.

In the operation of any device for maintaining constant temperature by the operation of a temperature responsive element in association with heating means, there is a range of temperature within which the heating means will be in operation during the portion of a cycle of operation when the temperature of the device is increasing, and will not be in operation during the portion of the cycle when the temperature is decreasing. If the heating element is in intimate thermal association with the temperature responsive device there will be a minimum of thermal lag between the two. That is, the heating element will be brought into operation with a minimum of delay after the temperature of the responding element falls to the point of operation, and will be shut off with a minimum of delay after the temperature of the responding element rises to the point where the heating element is to be shut off. If such a condition obtains, that is, if there is such intimate thermal association, the period of operation of the heating element will be shortened, and the temperature of the element to be controlled may be maintained within prescribed limits with less thermal insulation to isolate it from the ambient atmosphere. The weight, and particularly the size, of the constant temperature device may therefore be considerably reduced.

In the application of these principles to apparatus for maintaining the temperature of a piezo-electric crystal constant within narrow limits, a housing composed of good insulating material is provided which may be sealed to preclude changes in pressure and humidity, to minimize changes in temperatures and to keep out dirt, dust, etc. Within this housing a piezo-electric crystal is mounted between two electrodes in the usual manner. The lower electrode, however, is an inverted cup or cylinder of suitable conducting material. Around this cup, and in as good thermal contact therewith as possible, is wound a heating coil. The coil is preferably contained in a recess in the outer periphery of the cup in order to provide a smooth contour. Within the cup, and protruding through an aperture in the wall thereof, is mounted a temperature responsive element, which may be a mercury-in-glass device with suitable contact points, and surrounding the responding element so that the responding element is embedded therein, is a mass of Wood's metal, or other similar material. In the manufacture of the device the responding element is placed in the cup and the Wood's metal, in a molten state, is poured into the cup. Intimate thermal association of the responding element with the walls of the cup, and hence with the heating coil, is thus assured, so that the heating element is associated through a path of good thermal conductivity with the responding element. The operation of the device does not require a temperature above the melting point of Wood's metal, so that it is rigid, rugged, efficient and portable.

To keep the Wood's metal firmly in position when the cup is inverted a recess is provided in the inner wall of the cup which retains the Wood's metal securely in place after cooling.

A portion of the subject matter diclosed herein is claimed in copending application of Hovgaard, Serial No. 449,735, filed May 5, 1930, in particular the organization of the heating means, thermostat, and electrode in which all three are in intimate heat conductive relationship.

In the drawing Fig. 1 is a plan view partly in section of a constant temperature crystal holder built in accordance with the principles of this invention.

Fig. 2 is a cross-section along line 2—2 of Fig. 1;

Fig. 3 is a cross-section along line 3—3 of Fig. 2; and

Fig. 4 is a diagram of a heating circuit.

A cup shaped base or mounting member 1 is provided with a cover 2 which is secured to the base by bolts 3. Within said base is an inverted cup 4 which serves as the lower electrode for a piezo-electric crystal 5. An upper electrode 6 rests on the piezo-electric crystal and is retained in position by a spring 7 which is mounted upon the end of screw 8 threaded in a bushing 9, which is held in fixed engagement with the cover by a key 10. A chuck 11 mounted on the shank of the screw provides means for making electrical contact to the upper electrode.

The cup 4 contains a thermostat 12 embedded in a material having a low melting point and good heat conducting properties, preferably Wood's metal. This is accomplished as follows: The cup is placed upright and the thermostat placed in position through an aperture 13 in the wall of the cup. The aperture surrounding the thermostat is then filled with plastic material and the cup is filled with molten Wood's metal which is allowed to cool and harden. A heating coil 14 is then wound around the outside of the cup in the recess provided therefor and the cup is placed in position in the base, the thermostat projecting through an aperture therein. This aperture is then filled with plastic material, which may be the same material used before, and the base is thus made ready for assembly with the rest of the structure. A contact element 15 in the bottom of the thermostat makes contact with one end of the heating coil. The other end of the heating coil is connected with a jack 16 projecting through the base member. The thermostat has an upper contact point 17 which is connected by means of a lead 18 to a second jack 19 similarly projecting through the base member. These jacks are provided to facilitate replacement of the holder in case of a breakdown.

The lower thermostat contact 15, the end of the heating coil to which it is connected, and the lower electrode are all at a common ground potential, so that suitable connections may be made to electrical apparatus to be associated with the device, and which complete separate circuits through the heating coil, the thermostat and across the electrodes. Set screws 20 (Fig. 3) are provided to maintain the cup assembly more securely in position.

There is of course provided in connection with the holder a source of electric current for heating the heating coil, and means responsive either directly, or through relays under control of the responding element, for controlling the flow of current in the heating coil. Many such systems are well known in the art. A typical circuit is shown in Fig. 4, in which a battery 41 furnishes current to a heating coil 14 to heat the thermostat 12. The mercury in the thermostat rises and makes contact with lead 17, completing a circuit from a battery 42 through a relay 43. The relay actuates its armature 44, breaking the circuit through the heating coil.

What is claimed is:

1. Temperature regulating means comprising in combination a conductive element adapted to be in efficient heat-transfer relation to the material whose temperature is to be regulated, a solid mass of low melting conductive material in contact with said conductive element, temperature responsive means in intimate heat-transfer relation with said low melting conductive material, and heating means associated with said element and in intimate heat-transfer relation to said conductive material.

2. Temperature regulating means comprising a heating element, a temperature responding element, means for controlling the operation of said heating element in response to variations in said responding element, and means comprising a solid mass of good thermally conductive material having a low melting point for providing a good thermal connection between said heating element and said responding element.

3. Temperature regulating means comprising a temperature responding element embedded in Wood's metal, an electrical heating element surrounding said Wood's metal, a source of electrical current connected to said heating element, and means responsive to the operation of said responding element to control the flow of current in said heating means.

4. A piezo-electric crystal holder comprising a plurality of electrodes, a mass of Wood's metal in contact with one of said electrodes, a thermostat embedded in said Wood's metal, heating means thermally connected with said electrode and said Wood's metal, and means under control of the thermostat for regulating the heating of said heating means.

5. An electrode for a piezo-electric crystal comprising a hollow member, a mass of Wood's metal in said hollow member, and a thermostat embedded in said Wood's metal.

6. An electrode for a piezo-electric crystal comprising a hollow portion, a solid mass of conductive material having a low melting point in said hollow portion, and a temperature responding element embedded in said conductive material.

7. A piezo-electric crystal holder comprising a mounting member, an electrode filled with Wood's metal, a thermostat embedded in said Wood's metal, a heating coil, and leads from said heating coil and said thermostat connected with jacks in said mounting member.

BURRELL STALLARD.